United States Patent [19]
Schlegel et al.

[11] Patent Number: 5,593,264
[45] Date of Patent: Jan. 14, 1997

[54] PIN RETAINER AND FLAG ASSEMBLY

[75] Inventors: Daniel K. Schlegel, Racine; Michael D. Morton, Salem, both of Wis.

[73] Assignee: Case Corporation, Racine, Wis.

[21] Appl. No.: 515,352

[22] Filed: Aug. 15, 1995

[51] Int. Cl.⁶ ................................................. F16B 21/16
[52] U.S. Cl. ............................ 411/522; 411/344; 411/351
[58] Field of Search ................................... 411/344, 351, 411/511, 522, 523, 524, 539

[56] References Cited

U.S. PATENT DOCUMENTS

| | | |
|---|---|---|
| 604,896 | 5/1898 | Garnett . |
| 789,209 | 5/1905 | Danielson et al. . |
| 1,569,311 | 1/1926 | Barstow . |
| 1,711,018 | 4/1929 | Ellis et al. . |
| 2,185,447 | 1/1940 | Smith ................................. 411/344 |
| 2,364,401 | 12/1944 | Stellin . |
| 2,647,294 | 8/1953 | Davis . |
| 2,713,386 | 7/1955 | Holtz . |
| 2,967,726 | 1/1961 | Weston . |
| 3,200,690 | 8/1965 | Dickman ............................ 411/351 |
| 3,278,137 | 10/1966 | Hartley . |
| 3,984,191 | 10/1976 | Doty ................................... 411/522 |
| 4,056,035 | 11/1977 | Centera . |
| 4,288,190 | 9/1981 | Benson . |

FOREIGN PATENT DOCUMENTS 0004821 of 1886 United Kingdom ................. 411/522

Primary Examiner—Steven N. Meyers
Assistant Examiner—Robert G. Santos
Attorney, Agent, or Firm—Foley & Lardner

[57] ABSTRACT

An assembly for retaining a pin in aligned bores of two structural members, such as clevis and a tang, includes a support member or boss, a retaining flag and a retaining pin. The retaining flag is slidably mounted on the support member and may be moved between a service position wherein the pin may be inserted into and removed from the bores and a locking position wherein the pin is held in the bores, preferably locked from rotation. The flag includes an opening having engagement surfaces for contacting a groove in the pin in the locking position. The flag is held on the support member by abutment surfaces. Two abutment surfaces serve to guide the flag in its sliding motion between the service and locked positions. Other abutment surfaces maintain the flag on the support member and prevent removal of the flag. The abutment surfaces contact the retaining pin in the locking position to maintain the flag in the locking position. Forces tending to rotate the pin in the bores are transmitted to the flag to the support member, but not to the retaining pin, thereby reducing the likelihood of failure of the assembly due to shearing of the pin.

17 Claims, 2 Drawing Sheets

PIN RETAINER AND FLAG ASSEMBLY

BACKGROUND OF THE INVENTION

The present invention relates generally to a pin retainer and flag for holding a pin in place with respect to pivotally attached structure members. More particularly, the invention is directed a pin retainer assembly for use on a tractor or similar work vehicle for providing a pivotal coupling between the tractor and an implement.

In the art of pin retainer and flag assemblies for holding a pin in a pivotal joint, such as for tractors and other work vehicles, a variety of structures have been proposed and are currently in use. Such arrangements typically include a pin that is removably fitted into a bore of a structural member, such as a clevis. Clevises of this type are found in many applications such as for coupling various mechanical linkages and actuators in a hitch, where pins and retainers serve to connect lift links and actuators to a rocker arm extending rearwardly from the tractor. The pin in such structures typically extends through a hole in a mating element, such as an actuator tang or a lift link end, aligned with the bore in the clevis to pivotally couple the structural member with the mating element. Conventional assemblies commonly include a pin having an enlarged head or other stop at one end which abuts the structural member on one side and a free end designed to be inserted through the aligned bores in the structural member and mating element. Once installed, the pin is retained in the aligned bores by various means, such as by a securing pin inserted into a through-hole in the pin adjacent to its free end.

Such pin retainer assemblies are designed to prevent axial movement of the retaining pin along its longitudinal axis to maintain the pin in its installed position in the assembly during operation and thereby to maintain the coupling between the members joined by the pin. Such assemblies typically also prevent the pin from rotating within the bore. Moreover, in certain applications, industry standards require that the retainer be permanently attached either to the structural member or to the pin so that the retainer will always be present and available whenever the pin is inserted to make up the joint. This is particularly true for ISO regulations regarding flagging mechanisms for work vehicle hitches. Conventional pin retainer assemblies are typically attached to the structural members by chains, cables and the like.

In many applications, the structural members and mating elements must rotate through some angle with respect to one another, for example, where retaining pins are used to couple an implement or various hitch elements to a work vehicle. This rotation may subject the pin to considerable torque tending to rotate the pin about its axis within the aligned bores. To eliminate wear between the pin and the bores in the structural members, it is often preferable to prevent pin rotation within the structural members or to selectively permit rotation within one member while preventing rotation within another. Several structures have been proposed to control retaining pin rotation while at the same time resisting axial movement of the pin. In one such structure, the retaining pin includes a flange fixed at one end, the flange extending along the structural member and being secured to it at a point radially outward from the pin, such as by a screw. An example of such an arrangement is disclosed in U.S. Pat. No. 2,967,726 issued Jan. 10, 1961 to Weston. In that assembly, a flange is rigidly connected to one end of a clevis pin such as by welding. The flange extends generally at a right angle with respect to the axis of the pin. To retain the pin and prevent its rotation, a cap screw extends through the flange at a point spaced apart from the pin and is lodged in a threaded bore in the structural member. The screw is received in the structural member in such a way that it may be deflected to a certain extent to absorb forces exerted by the flange as a result of torques on the retaining pin. However, the performance of this and similar assemblies is severely limited in that the screw must withstand essentially all forces acting between the pin and the structural member and transfer the forces to the frame in which it is fixed. In particular, the fastener must transfer all rotational forces transmitted by the pin to the flange. Such structures typically fail by shearing or other rupture of the screw as a result of these forces. A further disadvantage of this structure is that it requires a special tool, typically a screwdriver or wrench, to attach or remove the retaining pin.

U.S. Pat. No. 1,711,018, issued Apr. 30, 1929 to Ellis et al., discloses a spring bolt which is secured in a bore of a structural member at one end by a nut. At the other end of the bolt is a removable head in the form of a removable key that engages notches on the bolt. To maintain the head on the bolt, a recess, shaped to fit the head once attached to the bolt, is formed on the structural member. To prevent the head from rotating with respect to the structural member, a protuberance is formed on the key that fits into a similarly shaped portion of the recess.

This arrangement has several disadvantages. First, it requires a specially shaped asymmetrical recess to be formed to mate with the key, which presents difficulties from a manufacturing standpoint. Second, the assembly is difficult to use on a tractor or the like where frequent changes of the pin joint may be necessary. In particular, an operator must perform numerous steps for mounting the joint, namely, attaching the key to a first end of the bolt, pushing the bolt into the bore of the structural member until the key is received within the recess, and finally attaching a nut or the like to a second end of the bolt. Third, this design requires several separable parts that are easily lost, contrary to the requirement that all members of the retainer assembly be permanently coupled to the vehicle or to the pin. Finally, the threads on the bolt can be easily damaged when used in the field, making it difficult or impossible to thread the nut in place on the bolt.

Thus, there is a need for an improved pin retainer capable of retaining a pin in its axial position and preventing its rotation. It is an object of the present invention to provide such a pin retainer. It is a further object of the present invention to provide a pin retainer and flag assembly which affords easy mounting and removal of the pin. It is still another object of the present invention to provide a pin retainer and flag assembly in which all members of the retainer mechanism may be permanently coupled to a structural member without the need for extra coupling members such as chains, cables, wires, or the like.

SUMMARY OF THE INVENTION

Thus, in accordance with a first aspect of the invention a pin retainer and flag assembly is provided for retaining a pin extending through a bore in a structural member. The assembly includes a support member, a flag and a flag retainer. The support member protrudes from the structural member in spaced apart relation with respect to the bore. The flag is in engagement with the support member and is supported for sliding movement on the structural member between a locking position and a service position. The flag includes an opening having at least one engagement surface for contacting a corresponding surface of the pin to retain the pin in the bore. The flag transmits forces exerted on the pin to the support member. The flag retainer is coupled to the support member for maintaining the flag in engagement with the support member.

In accordance with another aspect of the invention, a retainer assembly includes a boss, a flag, a securing pin and means for releasably securing the flag in a locking position. The boss is fixed on the structural member and has a through-hole for receiving the securing pin. The flag has an opening and a guiding slot and is adapted for sliding movement between a locking position and a service position on the structural member. The guiding slot receives and engages the boss to guide the flag for linear movement between the locking and service positions. In the locking position a portion of the flag bordering the opening meshes with a complementary engagement surface of the pin to prevent rotational and axial movement of the pin in the structural member. The securing pin is received in the through-hole of the boss and bears against the flag to maintain the flag in engagement with the boss.

In accordance with yet another aspect of the invention, an assembly is provided for retaining a pin in aligned bores of first and second structural members and for preventing rotation of the pin with respect to the first structural member. The assembly includes a support member extending from the first structural member, a retaining flag and a locking member. The retaining flag is in contact with the support member and is slidable between a service position and a locking position. In the service position the pin is removable from the bores, while in the locking position the flag contacts the pin to prevent removal of the pin from the bores. The flag includes at least one engagement surface for contacting a corresponding surface of the pin to transmit torque applied on the pin to the flag in the locking position. The flag transmits torque applied on the pin to the support member. The locking member cooperates with the retaining flag to maintain the retaining flag in the locking position.

BRIEF DESCRIPTION OF THE DRAWINGS

The present invention will become more fully understood from the following detailed description, taken in conjunction with the accompanying drawings, wherein like reference numerals refer to like parts, in which:

FIG. 3 is a perspective schematic view of the FIG. 1 embodiment showing the flag in the locking position.

DESCRIPTION OF THE PREFERRED EMBODIMENTS

Figure 1:
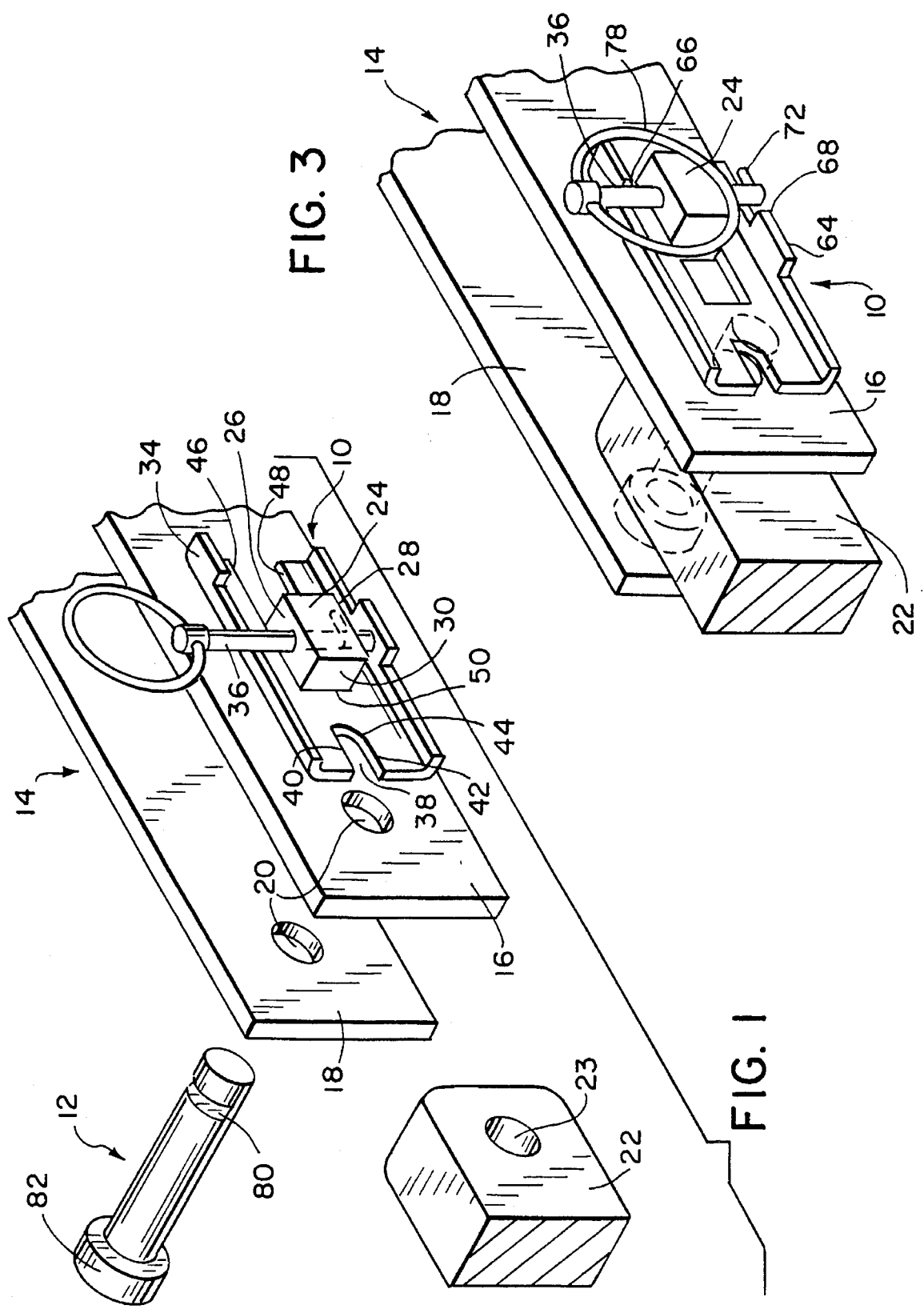
FIG. 1 is a perspective schematic view of a preferred embodiment of a pin retainer and flag assembly, showing the flag in its service position.

Turning now to the drawings and referring to FIG. 1, a pin retainer and flag assembly 10 for retaining a pin 12 is shown attached to structural member 14 such as an open-ended clevis. As illustrated in FIG. 1, structural member 14 includes a pair of side flanges 16 and 18 having coaxial through-holes or bores 20, forming a clevis bracket. Pin 12 may be inserted into bores 20 to attach structural member 14 to a mating member 22, typically a tang end or tongue of a lift link, an actuator (e.g. hydraulic cylinder) or a piece of farm or industrial equipment, such as a plow, harrow, rake, baler, trailer, or similar device commonly used for road building, maintenance or farm tasks. To receive pin 12, member 22 has a through-hole or bore 23 that comes into alignment with bores 20 as member 22 is coupled to member 14 as will be readily appreciated by those skilled in the art.

One side flange 16 of structural member 14 has a boss 24 extending laterally from its surface. Boss 24 is either integrally formed with structural member 14 such as by casting or is rigidly connected to it such as by welding or with suitable fasteners. In the embodiment shown, boss 24 has the shape of an elongated cube having opposing side walls 26, 28, a frontal wall 30, and a through-hole 52. The boss supports and guides the motion of a retaining flag 34 as described in greater detail below.

In the preferred embodiment illustrated, retaining flag 34 is a generally flat sheet or plate, supported on structural member 14 and capable of lateral movement along side flange 16 of member 14. This support and guidance is provided by boss 24 in conjunction with a securing pin 36 that serves to permanently attach flag 34 to member 14. Flag 34 is provided with an opening 38 that engages one end of pin 12 when assembly 10 is in a locked position. Opening 38 has straight wall portions 40, 42, joined by a curved wall section 44 to engage pin 12, as will be discussed in detail below.

Figure 2:
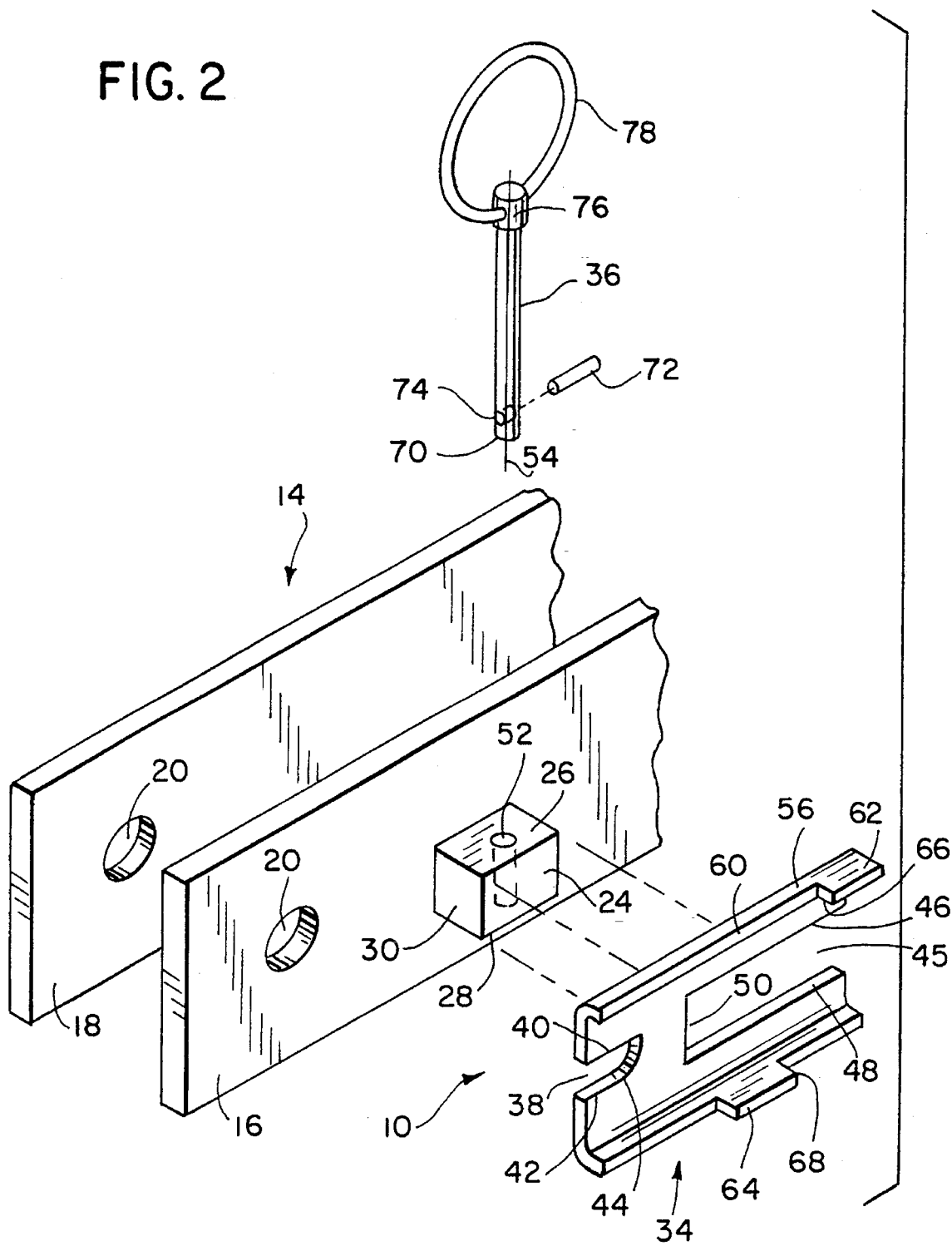
FIG. 2 is an exploded view of the assembly shown in FIG. 1, illustrating how the various parts of the assembly are interconnected.

As best illustrated in FIG. 2, flag 34 is further provided with an elongated slot 45 defined by parallel abutment surfaces 46, 48 and a forward abutment surface 50, configured to receive boss 24. Thus the width of the slot is preferably slightly greater than the width of boss 24, and the length of the slot preferably exceeds the length of boss 24. Surfaces 46 and 48 abut opposing side walls 26 and 28, respectively, of boss 24, yet allow sliding movement of flag 34 with respect to boss 24. Surfaces 46 and 48 thereby provide a guiding function and restrict flag 34 to linear movement in a direction predetermined by the alignment or orientation of side walls 26 and 28 of boss 24. As flag 34 thus slides forward (i.e. toward bore 20) and backward (i.e. away from bore 20) guided by sidewalls 26 and 28, its backward motion is limited by abutment of surface 50 with frontal wall 30 of boss 24 as shown in FIG. 1. It will be noted, therefore, that the lengths of abutment surfaces 46 and 48, together with the location of surface 50, limit the range of movement of flag 34. A means for limiting the motion of flag 34 in a forward direction, thereby preventing the removal of flag 34 from member 14 is likewise provided and will be discussed in more detail below.

A through-hole or bore 52 is formed in boss 24 for receiving securing pin 36. Bore 52 extends generally perpendicularly to the direction of movement of flag 34. Securing pin 36 is movable within through-hole 52 in a direction parallel to its longitudinal axis 54, and may be shifted from a service position shown in FIG. 1, in which pin 12 can be inserted into and removed from bores 20 and 23, to the locking position shown in FIG. 3, in which pin 12 is locked in bores 20 and 23 by flag 34.

In addition to opening 38 and slot 45, flag 34 further comprises upper and lower flanges 56 and 58, respectively, which extend outwardly from structural member 14 in the preferred embodiment illustrated. Typically, flanges 56 and 58 are formed by bending the plate material of flag 34 approximately 90 degrees. Upper flange 56 forms a guiding surface 60 that abuts securing pin 36 when mounted in assembly 10. As pin 36 is slid between its service and locking positions (i.e. raised and lowered) in through-hole 52, surface 60 and securing pin 36 together secure flag 34 to structural member 14, yet permit translation of flag 34 with respect to the structural member. Upper flange 56 and lower flange 58 are additionally provided with projections 62 and 64, respectively, that protrude upwardly beyond the level defined by guiding surface 60. Upper projection 62 presents a forward abutment surface 66, while lower projection 64 has a rear abutment surface 68. Surfaces 66 and 68 limit the motion of flag 34 when assembly 10 is in the locking position illustrated in FIG. 3. As shown in FIG. 3, surface 66 abuts an upper shank portion of securing pin 36, while surface 68 abuts a lower shank portion of securing pin 36. In this position, securing pin 36 prevents flag 34 from being drawn away from pin 12 by abutment between surface 68 and securing pin 36. Similarly, abutment of surface 68 with securing pin 36 prevents flag 34 from being drawn toward pin 12. It should be noted that when securing pin 36 is raised in through-hole 52 (as shown in FIG. 1), pin 36 no longer contacts abutment surface 68, permitting flag 34 to be drawn rearwardly into its service position for removal of pin 12. It should also be noted that in this service position, abutment surface 66 serves to prevent flag 34 from sliding off of boss 24 in a forward direction and thereby escaping boss 24.

A lower end 70 of securing pin 36 is secured from removal from boss 24 by a retainer or roll pin 72, or a similar fastener permanently secured in a bore 74 in lower end 70 of retaining pin 36 during assembly. Retainer 72 allows pin 36 to be moved within through-hole 52, yet prevents pin 36 from being inadvertently withdrawn from through-hole 52. On an upper end 76 of securing pin 36 a handling ring 78 is attached. Ring 78 provides an operator with a convenient handle for easily shifting securing pin 36 between the positions shown in FIGS. 1 and 3. In addition, handling ring 78 can be rotated to wrap around boss 24 as shown in FIG. 3, thus preventing securing pin 36 from being inadvertently withdrawn when flag 34 is in its locking position. Although ring 78 may move freely on securing pin 36, it preferably includes an offset, providing spring loading tending to bias ring 78 into the locking and service positions. Such snap or spring-loaded ring-to-pin mountings are well known to those skilled in the art.

As shown in FIG. 1, a groove or slot 80 is formed in pin 12 for receiving a portion of flag 34 in the locking position. The width of groove 80 is slightly larger than the thickness of flag 34 adjacent to opening 38. Opening 38 and groove 80 are configured so that upper wall portion 40 is received into and abuts the bottom of groove 80 when the assembly is in the locked position shown in FIG. 3. In addition, curved wall portion 44 of opening 38 abuts the outer curved surface of pin 12 when the pin is locked into position by flag 34. In this manner wall portions 40 and 44 of opening 38 form engagement surfaces coupling flag 34 and pin 12.

In use, assembly 10 may be moved to its service position as shown in FIG. 1 by drawing securing pin 36 upwardly and flag 34 rearwardly to clear bore 20. The service position allows free insertion and removal of pin 12 into bores 20 and 23. An operator may shift flag 34 from the service position shown in FIG. 1 to the locking position illustrated in FIG. 3, within the range of movement limited on the one end by the slot wall 50 abutting boss 24 (shown in FIG. 1) and on the opposite end by surface 66 abutting against the securing pin 36 (shown in FIG. 3).

For coupling members 14 and 22, an operator first aligns bores 20 and 23, then inserts pin 12 with flag 34 in its service position. Insertion stops when an abutment structure, such as a head 82, formed on pin 12 contacts flange 18. When pin 12 is fully inserted, groove 80 of pin 12 is positioned outboard of flange 18 and is aligned with flag 34, allowing flag 34 to be moved from its service position to its locking position. The operator then moves flag 34 along flange 18 to lock pin 12 into place. In this manner, opening 38 is advanced toward pin 12 so that wall portion 40 enters into groove 80 and wall portion 44 abuts the outer surface of pin 12. At this point, securing pin 36 will clear projection 64 and securing pin 36 is lowered in through-hole 52. Handling ring 78 may then be locked around boss 24 by rotating it about its mounting point on securing pin 36 until ring 78 engages boss 24. To remove pin 12, these steps are reversed.

It should be noted that by virtue of the particular configuration of opening 38 and its cooperation with groove 80 and the outer surface of pin 12, any rotational forces applied to pin 12 are transmitted to flag 34 and thence to boss 24, which is fixed to structural member 14. Thus, rotation of pin 12 with respect to bores 20, and resulting wear of pin 12 and bores 20 is greatly reduced or eliminated. The engagement surfaces 40, 42 and 44 of opening 38 in effect convert torques applied to pin 12 into a force couple resisting rotational movement of the pin. This couple is then transmitted to boss 24 via flag 34. This unique arrangement effectively separates the retention function of retaining pin 36 from the load bearing function of flag 34 and boss 24, providing a significant advantage over existing pin retaining arrangements.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims. For example, it will be apparent to persons skilled in the art that many alternative arrangements instead of boss 24 for providing a support member are available. In principle various alternative structures may limit flag 34 to linear movement, i.e. block flag 34 against rotational movements about the longitudinal axis of pin 12. By way of example, two parallel guide walls which enclose and guide flag 34 by abutting against both sides of flag 34, or any other track or rail structure could be used. Also, it should be noted that opening 38 of flag 34 providing the engagement surfaces for pin 12, may have alternative forms and is not limited to open-ended slots, but could be formed as a closed slot completely surrounded of flag 34.

We claim:

1. A pin retainer and flag assembly for retaining a pin having a longitudinal axis and extending through a bore in a structural member, comprising:

a rectangular boss protruding from the structural member in spaced apart relation to the bore;

a flag in engagement with the rectangular boss and supported for sliding movement on the structural member between a locking position and a service position, the flag including an opening having an engagement surface for contacting a corresponding surface of the pin to retain the pin in the bore and abutment surfaces contacting the rectangular boss and guiding the flag between the locking and service positions, the abutment surfaces forming a slot including two opposing surfaces engaging the rectangular boss, the flag transmitting forces exerted on the pin to the rectangular boss; and a flag retainer coupled to the rectangular boss for maintaining the flag in engagement with the rectangular boss.

2. The assembly of claim 1, wherein the pin includes a groove substantially transverse to the longitudinal axis of the pin, and the engagement surface includes a first wall portion configured to mate with the groove and a second wall portion configured to abut an outer surface of the pin.

3. The assembly of claim 2, wherein the first and second wall portions border an open ended slot at an end portion of the flag.

4. The assembly of claim 2, wherein the second wall portion is curved to conform to a curved outer surface of the pin.

5. The assembly of claim 1, wherein the flag retainer comprises a securing pin mounted on the support member in abutment with a guide portion of the flag.

6. The assembly of claim 1, further comprising securing means for locking the flag in the locking position.

7. The assembly of claim 6, wherein the flag retainer includes a retaining pin mounted in the support member and slidable between a raised position and a lowered position, and the securing means includes first and second abutment surfaces on the flag, the abutment surfaces contacting the retaining pin to maintain the flag in the locking position.

8. A retainer assembly for releasably retaining a pin extending through a bore in a structural member, comprising:

a boss fixed on the structural member and having a through-hole;

a flag having an opening and a guiding slot and adapted for sliding movement between a locking position and a service position on the structural member, the guiding slot receiving and engaging the boss to guide the flag for linear movement between the locking and service positions, wherein in the locking position a portion of the flag bordering the opening meshes with a complementary engagement surface of the pin to prevent rotational and axial movement of the pin in the structural member;

a securing pin received in the through-hole, the securing pin bearing against the flag to maintain the flag in engagement with the boss; and means for releasably securing the flag in the locking position.

9. The assembly of claim 8, wherein the securing pin is slidably received within the through-hole and is adapted to be moved between a raised position and a lowered position, and wherein the means for releasably securing further comprises first and second abutment surfaces on the flag, the first and second abutment surfaces blocking movement of the flag in the locking position by abutment with the securing pin.

10. The assembly of claim 9, wherein the first and second abutment surfaces are flange portions on opposite sides of the flag.

11. The assembly of claim 9, wherein the first abutment surface abuts the securing pin in the locking and service positions to prevent removal of the securing pin from the boss.

12. The assembly of claim 9, wherein the securing pin includes a retainer, the retainer preventing removal of the securing pin from the through-hole.

13. The assembly of claim 9, wherein the securing pin includes a handling ring.

14. An assembly for retaining a pin in aligned bores of first and second structural members and for preventing rotation of the pin with respect to the first structural member, comprising:

support member extending from the first structural member;

a retaining flag in contact with the support member and slidable between a service position wherein the pin is removable from the bores and a locking position wherein the flag contacts the pin to prevent removal of the pin from the bores, the flag including an engagement surface for contacting a corresponding surface of the pin to transmit torque applied on the pin to the flag in the locking position, the flag transmitting torque applied on the pin to the support member; and a locking member having means for detachable engagement with retaining flag whereby said means for detachable engagement allows the locking member to be repeatably engaged and disengaged with the retaining flag.

15. The assembly of claim 14, wherein the retaining flag includes a slot, the engagement surface bordering the slot and entering a groove in the pin to retain the pin in the structural members and to prevent rotation of the pin.

16. The assembly of claim 14, wherein the locking member is a retaining pin slidably received in the support member, and wherein the retaining flag includes abutment surfaces contacting the retaining pin in the locking position to prevent sliding movement of the retaining flag.

17. The assembly of claim 14, wherein the retaining flag is supported on the support member and the locking member contacts the retaining flag to maintain the retaining flag on the support member.

* * * * *